United States Patent [19]
Frey et al.

[11] 4,335,886
[45] Jun. 22, 1982

[54] LABYRINTH SEAL WITH CURRENT-FORMING SEALING PASSAGES

[75] Inventors: Max Frey; Paul B. Krebs, both of Portland, Oreg.

[73] Assignee: Cornell Pump Company, Portland, Oreg.

[21] Appl. No.: 171,043

[22] Filed: Jul. 22, 1980

[51] Int. Cl.³ .................... F16J 15/44; F16J 15/42
[52] U.S. Cl. ........................... 277/25; 277/57; 415/111
[58] Field of Search ................. 415/110–112, 415/170 R, 170 A, 170 B, 172 R, 172 A; 277/3, 53, 55–57, 25, 13, 14 R, 14 V

[56] References Cited

U.S. PATENT DOCUMENTS

| | | |
|---|---|---|
| 1,129,038 | 2/1915 | Kerr . |
| 2,916,332 | 12/1959 | Pavlecka . |
| 3,231,285 | 1/1966 | Weltmer et al. ................. 277/53 |
| 3,251,601 | 5/1966 | Harvey . |
| 3,719,365 | 3/1973 | Emmerson et al. . |
| 3,797,962 | 3/1974 | Stahlecker . |
| 3,940,153 | 2/1976 | Stocker ........................... 277/57 |

FOREIGN PATENT DOCUMENTS

| | | | |
|---|---|---|---|
| 2901742 | 8/1979 | Fed. Rep. of Germany .......... 277/3 |
| 42114 | 11/1925 | Norway ............................. 277/13 |
| 1161159 | 8/1969 | United Kingdom ................. 277/56 |
| 1226772 | 3/1971 | United Kingdom ................. 277/56 |

Primary Examiner—Robert S. Ward, Jr.
Attorney, Agent, or Firm—Kolisch, Hartwell & Dickinson

[57] ABSTRACT

A labyrinth seal for sealing an impeller shaft within a pump housing. The seal includes inner and outer coaxial, relatively rotatable members secured to the shaft and the housing, respectively. Defined between the two members is a succession of axially extending sleeve-shaped passages of decreasing diameters progressing toward the pump interior, these passages being connected by radially extending disc-shaped passages. Fluid moving through the sleeve-shaped and disc-shaped passages flows into annular grooves formed at the ends of these passages, setting up currents which resist fluid flow through the seal.

9 Claims, 4 Drawing Figures

LABYRINTH SEAL WITH CURRENT-FORMING SEALING PASSAGES

BACKGROUND AND SUMMARY

The present invention relates to pump seals, and more particularly, to a labyrinth seal for sealing an impeller shaft within a pump housing.

Labyrinth seals are known devices used in sealing an element such as a rotary shift to inhibit undesired fluid flow past the shaft. The usual labyrinth seal, when incorporated with a pump, is relied upon to inhibit leakage along the shaft of the fluid being pumped by the pump. Unlike seals of this type, the labyrinth seal of the instant invention is intended to be incorporated with a centrifugal pump with an important function of the seal being to prevent leakage of air into the pump during the time that the pump is being primed.

When incorporated with a centrifugal pump for pumping a fluid such as water the seal of the invention, therefore, not only impedes the flow of water along the impeller shaft of the pump when the pump is pumping water, but also impedes the flow of air inwardly along the impeller shaft during periods when the pump is being primed.

Accordingly, one object of the present invention is to provide a labyrinth seal for sealing an impeller shaft in a centrifugal pump housing, where the seal restricts air flow into the pump during pump priming, and restricts water leakage out of the pump during normal pumping.

A more specific object of the invention is to provide for use in such a pump, a seal having a greater resistance to fluid flow in a direction extending toward the impeller of the pump.

Still another object of the present invention is to provide such a seal which is easily adjusted to obtain proper clearances therein.

With these objects in mind, the present invention in labyrinth seal includes inner and outer coaxial, relatively rotatable members which are adapted to be secured to the shaft and housing, respectively, in a pump. The two members have walls defining therebetween axially extending, sleeve-shaped passages of decreasing diameters progressing toward the interior of the pump. The passages are connected at their adjacent ends by radially extending disc-shaped passages. Formed in the outer and inner members are annular grooves into which fluid moving through the sleeve-shaped and disc-shaped passages flows, to set up fluid currents which resist fluid flow through the seal.

These and other objects and features of the present invention will become more fully apparent when the following detailed description of a preferred embodiment of the invention is read in connection with the accompanying drawings, wherein.

DETAILED DESCRIPTION OF A PREFERRED EMBODIMENT OF THE INVENTION

Figure 1:
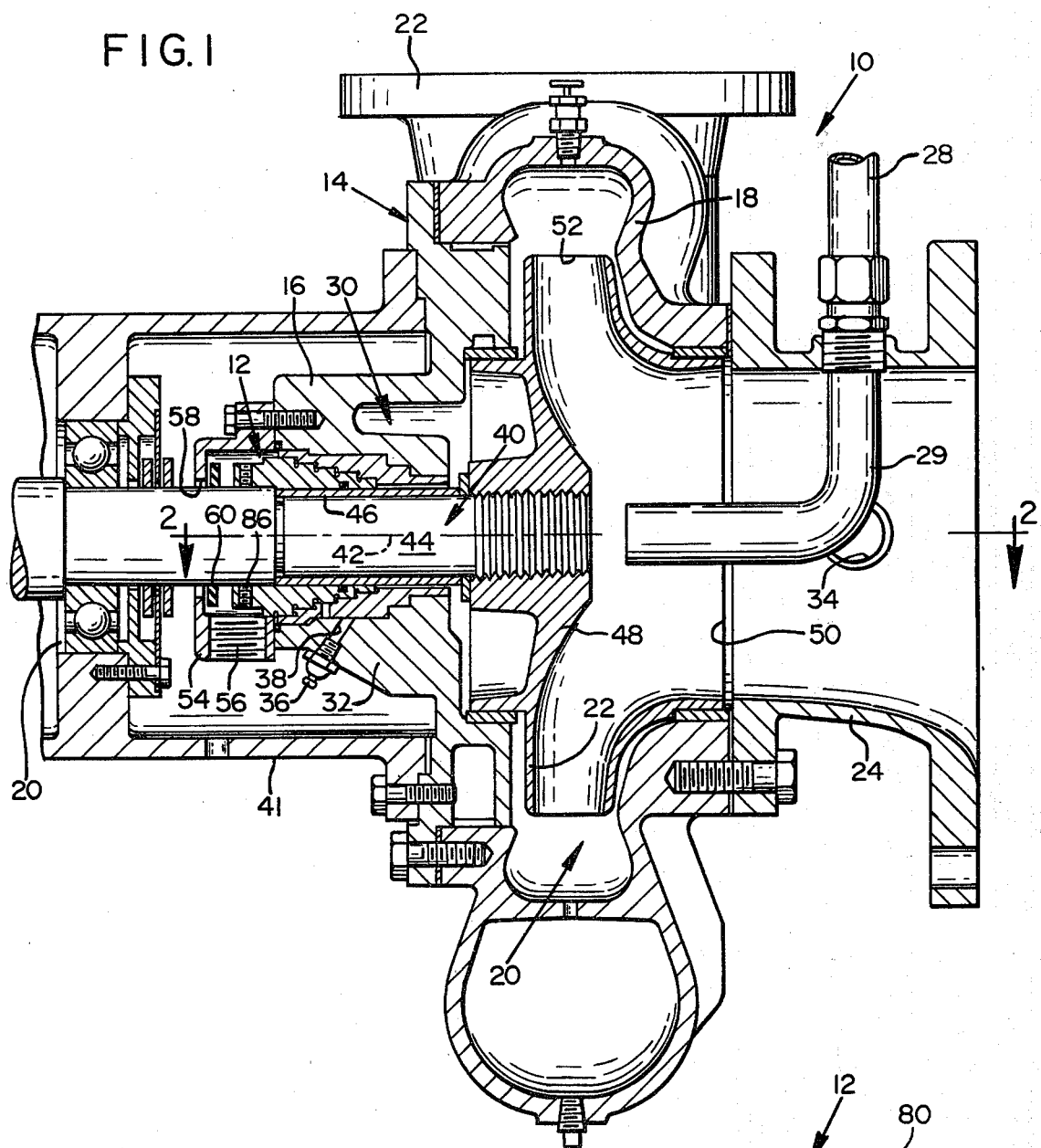
FIG. 1 is a sectional view of an impeller pump employing a labyrinth seal constructed according to the present invention.
Figure 2:
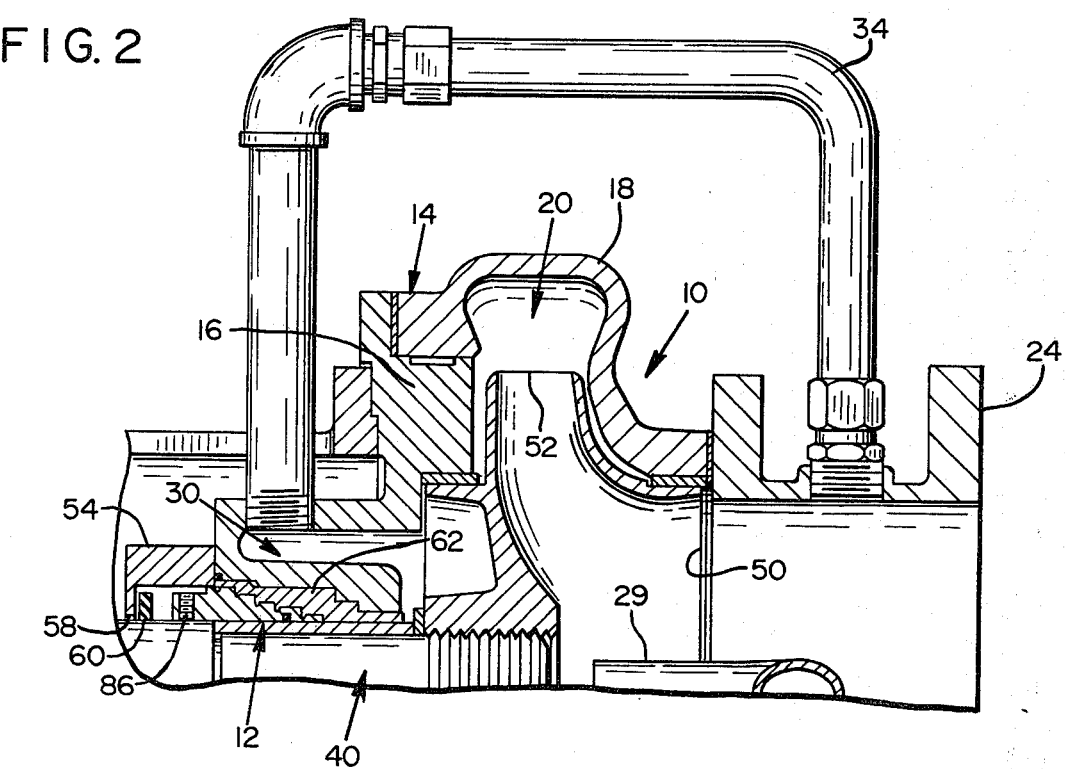
FIG. 2 is a fragmentary sectional view of the pump and seal, taken generally along line 2—2 in FIG. 1.

Referring to the drawings and first to FIGS. 1 and 2, there is shown generally at 10 an impeller-type water pump employing a labyrinth seal 12 constructed according to the present invention. Pump 10 has a pump housing 14 including a back plate 16 and a volute cover 18 which is sealed and bolted to plate 16. Housing 14 defines a generally spiral-shaped volute chamber 20 which is seen cross-sectionally in FIGS. 1 and 2. The chamber terminates at an outlet 22 in cover 18 at the top in FIG. 1. Attached to the right side of cover 18 in the figures, and communicating with a central opening therein, is an inlet spool 24 through which water is introduced into the pump. A vacuum line 28 connects with the interior of spool 24 with a tube 29 which extends to the eye of the pump.

Formed in plate 16 is a cavity 30. A lubrication nipple 36 in region 32 of plate 16 communicates with seal 12 through a bore 38. As seen best in FIG. 2, cavity 30 communicates with the interior of spool 24 through a balance line 34.

Bearing frame 41 is secured by fasteners to back plate 16. A shaft 40 is mounted on bearing frame 41 for powered rotation about an axis indicated by dash-dot line at 42 in FIG. 1. Shaft 40 has a reduced diameter segment 44 which is encased in a removable collar 46 which rotates with the shaft. An impeller 48 is threadedly attached to the right end of the shaft in FIG. 1 for rotation therewith in the interior of cover 18. The impeller faces to the right in FIG. 1, and has radial passages, such as passage 52, through which water is discharged centrifugally as the impeller is rotated with rotation of the shaft.

A seal gland 54 sealed and bolted to the left end of plate 16 in FIG. 1 acts to channel water leaking from the pump through a discharge port 56 formed in the gland. Shaft 40 is rotatably received through a circular opening 58 formed in the gland. A washer-like deflector 60 secured to the shaft for rotation therewith, adjacent opening 58, functions to impede water flow from the pump through the opening.

Figure 3:
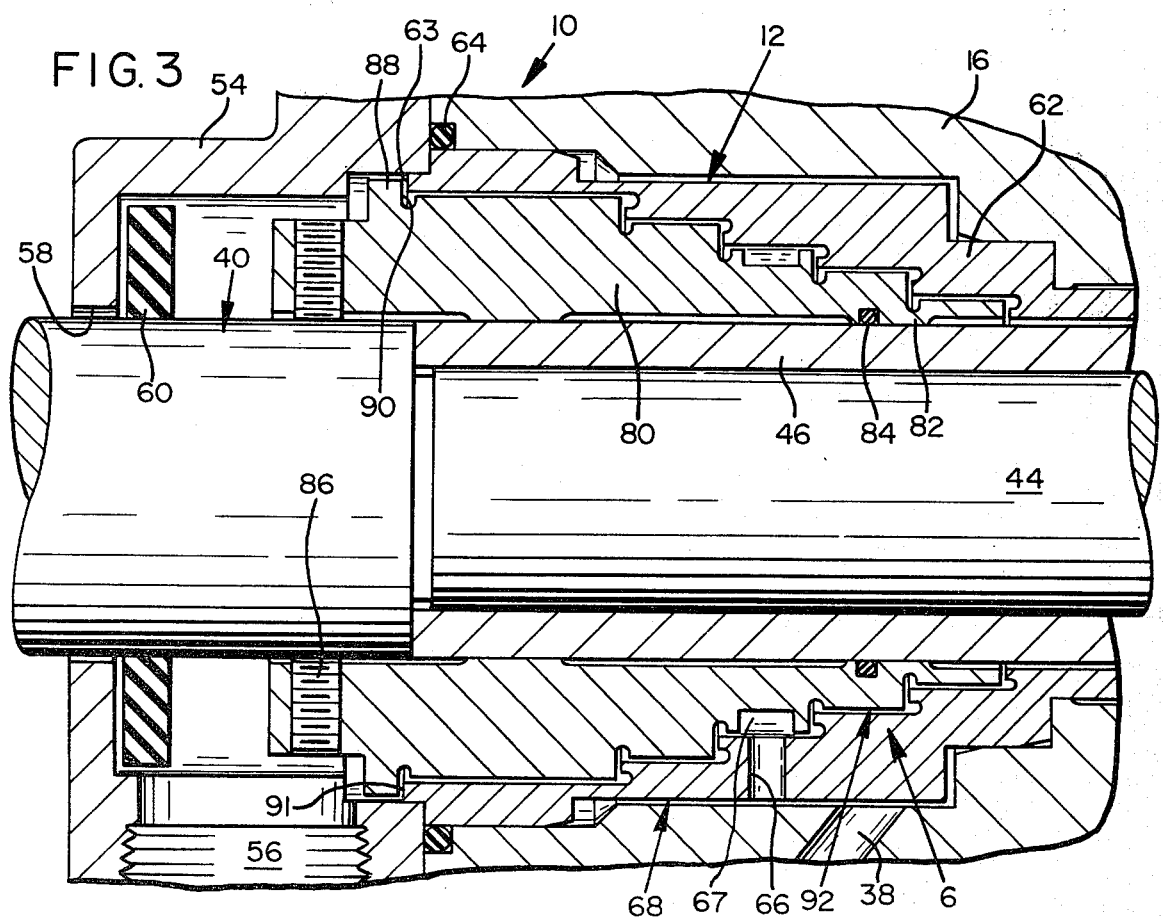
FIG. 3 is an enlarged, fragmentary view of the sealed shaft region of the pump.

With reference now particularly to FIG. 3, seal 12 includes an outer annular member 62 having the axial cross-sectional shape shown. Formed on the outer surface of member 62 is a succession of annular steps, alternate ones of which are dimensioned to be tightly received in complementary shoulders formed in plate 16 to allow member 62 to be press fitted into the plate. Member 62 terminates at its left end in FIG. 3 in a ring-like surface 63. As can be seen in FIG. 3, bolting of gland 54 to plate 16 serves to clamp member 62 in the plate and to compress an O-ring 64 therebetween. A lubrication channel 66 formed radially in member 62 communicates with bore 38 through an annular gap 68 formed between an outer surface region of member 62 and plate 16. Annular groove 67 constitutes a lubricant distribution groove.

Figure 4:
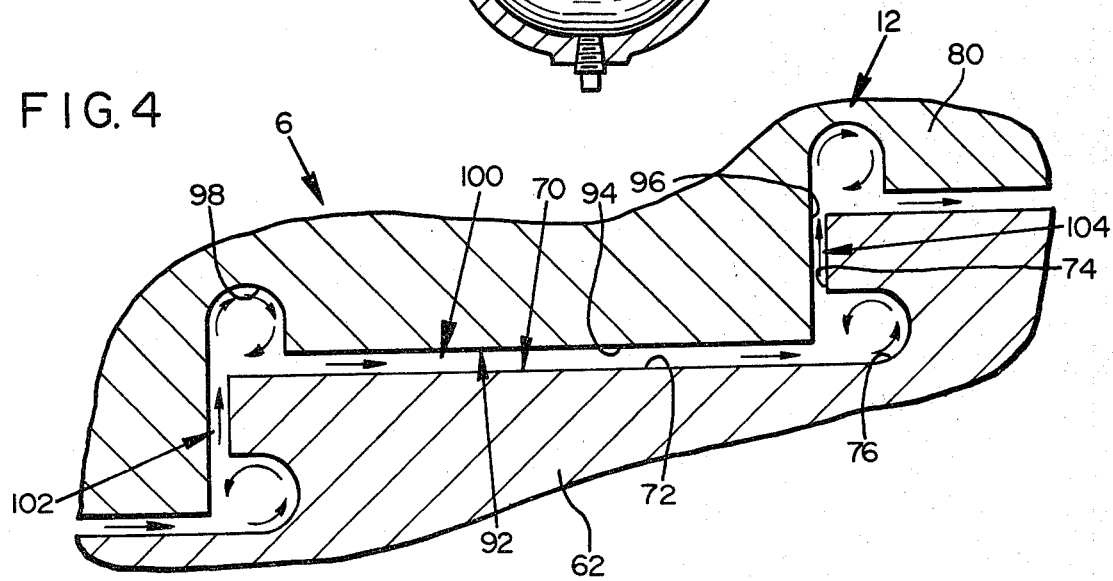
FIG. 4 is an enlarged sectional view of a portion of the seal indicated generally at 6 in FIG. 3.

Formed on the inner surface of member 62 is a succession of annular shoulders such as shoulder 70 (FIG. 4), the shoulders having successively smaller diameters on progressing toward the impeller, that is, toward the right in FIGS. 3 and 4. Referring to FIG. 4, each shoulder, such as shoulder 70, is formed of an annular, axially extending surface region, such as region 72, and a radially extending surface region, such as region 74. Formed in each shoulder, at the intersection of the shoulder's axially and radially extending surface regions, is an annular groove, such as groove 76 formed in shoulder 70. Groove 76, which is representative, is formed of a generally U-shaped annular wall, the outer side of which is tangential to region 72, and the inner side of which terminates on region 74 approximately radially midway therealong.

Seal 12 includes an inner annular member 80 which is secured to shaft 40 for rotation therewith. Members 62, 80 are coaxial and relatively rotatable. With reference particularly to FIG. 3, member 80 has a generally cylindrical inner surface on which are formed, at a pair of axially spaced positions, annular bulges, such as bulge 82, which are dimensioned to fit snugly about collar 46. An O-ring 84 received in an annular cavity formed in bulge 82 is used in sealing member 80 on collar 46. Member 80 is secured on the shaft for rotation therewith, at a desired axial position, by four set screws, such as screw 86, threadedly received in the left end region of member 80 at 90° intervals therein. An annular flange 88 formed in member 80 provides a ring-like surface 90 which confronts surface 63 and forms therewith a radially extending disc-shaped passage 91 which is exposed on the seal with member 80 nested within member 62, and with gland 54 removed.

Formed on the outer surface of member 80 is a succession of annular steps, such as step 92, having successively smaller diameters on progressing toward the pump's impeller. With reference to FIG. 4, each step, such as step 92, is formed by an axially extending surface region, such as region 94, and a radially extending surface region, such as region 96. The axially and radially extending surface regions in a step, such as step 92, confront and are closely spaced from the axially and radially extending surface regions, respectively, in an associated shoulder, such as shoulder 70 in member 62.

Formed in each step in member 82 is an annular groove, such as groove 98, formed in step 92. Groove 98, which is representative, is formed of a generally U-shaped wall portion whose left side in FIG. 4 is tangential to the radially extending surface region of the adjacent step in member 80, and whose opposite side intersects region 94 as shown, this groove having a width substantially equal to that of previously decribed groove 76.

The annular confronting surface regions of members 62, 80, are dimensioned to define therebetween a succession of axially extending sleeve-shaped passages, such as passage 100 defined between surface regions 72, 94, with the diameters of these passages decreasing progressing toward the pump's impeller. The just-mentioned passages are connected by radially extending a disc-shaped passages, such as passages 102, 104 connecting opposed ends of passage 100. The widths of the disc-shaped passages, including passage 91, are substantially equal. As seen in FIG. 4, groove 98 faces passage 102 and has a width which spans the width of this passage and an outer margin of passage 100. Similarly, groove 76 formed in member 62 faces passage 100 and has a width which spans the passage and an end margin of passage 104.

Seal 104 is placed in pump 10, with such in a dismantled condition, by press fitting member 62 in plate 16 and sliding member 80 over the pump shaft. After the pump is reassembled, but before gland 54 is bolted to plate 16, the axial spacing between the two seal members is adjusted by placing a feeler gauge between surfaces 63, 90 defining passage 91, then tightening the four set screws, such as screw 86, to establish the desired axial spacing between the two members. A typical gap setting for the disc-shaped passages in the seal may be in the neighborhood of a few thousandths of an inch. Screws, such as screw 86, are also referred to herein as fastening means. Gland 54 is bolted to plate 16 to complete seal installation.

The pump is primed by applying a vacuum to line 28, to draw water into the interior of the pump. The vacuum produced within the pump interior acts to draw air into the pump through port 56 and opening 58, and thence through seal 12. With reference to FIG. 4, it can be appreciated how the novel seal construction acts to restrict of air flow through the seal toward the impeller, that is, in a left-to-right direction in the figure. In the portion of the seal illustrated in FIG. 4, air moving radially through passage 102 enters groove 98, with the air following the wall contours of the groove to set up therein a rotating current which opposes the movement of gas toward the right along passage 100. Similarly, as air flows out of passage 100, it enters groove 76, setting up therein circular currents which oppose the direction of motion of the gas radially inwardly in passage 104. As the gas moves through each pair of radially and axially extending passages in the seal, it is similarly retarded by the countercurrent turbulance set up within each pair of grooves.

As can be appreciated from FIG. 3, when impeller 22 is rotatably driven during pump priming, shaft rotation produces centrifugal forces which oppose the movement of air radially inwardly through the radially extending disc-shaped passages in the seal, as the gas flows toward the impeller. Additional resistance to air inflow may be achieved by lubricating the seal prior to pump priming. With reference to FIG. 3, grease injected into bore 38, through nipple 36 (FIG. 1), becomes distributed within gap 68. The grease passes through bore 66 into annular groove 67 to become distributed in the annular passages between the seal members as the shaft is rotated.

When the priming operation is completed, vacuum line 28 is closed and the pump is placed in a normal pumping condition, where the rotating impeller imparts a high centrifugal velocity to water discharged into chamber 20, to increase the water pressure therein. During pumping, water under pressure in chamber 20 leaks through the annular space between the left side of the impeller in FIG. 1 and plate 16, into chamber 30 in plate 16. Water in chamber 30 leaks through the seal toward port 56, with the multiplicity of surfaces involved in the seal and the relatively narrow clearances of the passages therein serving to restrict water flow therethrough. Furthermore, water reaching the annular grooves in the seal tends to be circulated therein, adding increased resistance to water flow.

By providing balance line 34 connecting the interior of spool 24 with chamber 30 to the rear of the impeller, a high pressure condition behind the impeller is prevented from becoming established. In combination with the labyrinth seal which seals the impeller shaft within back plate 16, the balance line performs another very important function. Further explaining, where the fluid being pumped is water containing entrained material, such as sand, the balance line functions as a return conduit providing for the flow of water and any sand contained therein from behind the impeller back to the interior of spool 24. Flow tends to occur in this direction by reason of a lower pressure condition existing where the balance line connects with the spool than where the balance line connects with chamber 30. By providing this return path, any tendency for the entrained material in the water to be carried into the labyrinth seal is minimized.

From the foregoing, it can be appreciated how various stated objects of the present invention are met. The annular grooves in seal 12 are particularly effective in resisting fluid movement during priming—more so than during the pumping period—and this is important because it is during the priming of the pump that a labyrinth seal might not provide sufficient sealing. Resistance to fluid flow through the seal during pump priming is further resisted centrifugally when the impeller is rotated, and by lubrication which can be introduced into the seal.

The seal is easily installed in a pump of the type described, and readily adjusted to provide a desired axial positioning between the seal's two members.

While a preferred embodiment of the invention has been described herein, it is apparent that various changes and modifications may be made without departing from the spirit of the invention.

It is claimed and desired to secure as Letters Patent:

1. A labyrinth seal for sealing an impeller shaft within a pump housing comprising, inner and outer annular, coaxial, relatively rotatable members disposed with the inner member fitting within the outer member, the outer member being adapted to be secured to the housing and the inner member being adapted to be secured to the shaft, said members having walls defining therebetween a first axially extending sleeve-shaped passage, a second axially extending sleeve-shaped passage having a diameter which is less than the diameter of the first passage, said second passage following the first passage and having one end adjacent but radially inwardly from an end of said first passage, an annular disc-shaped passage substantially normal to the axis of the shaft intersecting the first and second sleeve-shaped passages, an annular groove in one of said members at the intersection of said first and said disc-shaped passages facing said first passage and having a width which spans the width of the first passage and an outer margin of said disc-shaped passage, and another annular groove in the other of said members at the intersection of said disc-shaped passage and said second passage facing said disc-shaped passage and, having a width which spans the width of the disc-shaped passage and an end margin of said second passage.

2. A centrifugal pump including a housing, an impeller shaft, and an impeller mounted at one end of the shaft, and having the seal of claim 1 providing a seal between the shaft and said housing, said inner member being secured to the shaft and the outer member being secured to the housing, said second sleeve-shaped passage being located toward the impeller from said first sleeve-shaped passage, and said one and the other of said members being said outer and inner members, respectively.

3. In a centrifugal pump which includes a housing and a rotatable shaft having an impeller mounted at one end thereof rotatably mounted within said housing, a labyrinth seal comprising an inner member secured to the shaft and an outer member nested over the inner member and secured to the housing, said inner and outer members defining therebetween a first elongate annular passage coaxial with the shaft, a second elongate annular passage extending from approximately that end of the first passage which is closer to the impeller, said second annular passage being coaxial with the shaft and having a lesser diameter than the first, a disc-shaped passage substantially normal to the shaft's axis connecting at its radially outer margin with said end of the first passage and at its radially inner margin to the end of the second passage which is farther from the impeller, an annular groove in said outer member facing and opening to said end of the first passage, and an annular groove in said inner member facing and opening to the radial inner margin of said disc-shaped passage, the annular grooves being bottomed by concavely curving bottom surfaces.

4. The seal of claim 3, wherein the grooves have widths substantially greater than the widths of the passages which they face.

5. A labyrinth seal for sealing a shaft within a housing, said seal comprising an elongate inner member adapted to be attached to the shaft for rotation therewith, said member having a succession of annular steps, each having radially and axially extending surface regions, there being formed in the axially extending surface region of each step an annular cavity having a rounded wall portion which is tangential to the radially extending surface region in an adjacent step, and an elongate outer member adapted to be secured to said housing, surrounding and coaxial with said inner member, said outer member having a succession of annular shoulders, each shoulder having axially and radially extending surface regions which confront and are closely spaced from axially and radially extending surface regions, respectively, of an associated step in said inner member there being formed in the radially extending surface region in each shoulder an annular cavity having a rounded wall portion which is tangential to the axially extending surface region in such shoulder.

6. The seal of claim 5, wherein the spacing between radially extending surface regions in said two members is adjustable.

7. In a centrifugal pump which includes a housing and a rotatable shaft having an impeller mounted at one end thereof rotatably mounted within said housing, a labyrinth seal for sealing the shaft in said housing comprising an inner member secured to the shaft and an outer member nested over the inner member secured to the housing, said inner and outer members defining therebetween, progressing axially toward said shaft's one end, an initial radially inwardly extending disc-shaped passage, a sleeve-shaped passage extending axially of the shaft joining at one end with the disc-shaped passage, and successive radially inwardly extending disc-shaped passages joining with axially extending sleeve-shaped passages following one another along the seal, said initial disc-shaped passage being exposed on the seal to enable the measuring of the width thereof, said inner member being secured to the shaft through fastening means which is exposed with the inner member nested within the outer member.

8. In a centrifugal pump which includes a housing and a rotatable shaft having an impeller mounted at one end thereof rotatably mounted within said housing, said housing defining an intake region in front of the impeller, a labyrinth seal sealing the shaft to the housing located to the rear of the impeller, said labyrinth seal comprising an inner member secured to the shaft and an outer member nested over the inner member secured to the housing, said inner and outer members defining therebetween, progressing axially on the shaft, a radially inwardly extending disc-shaped passage, a sleeve-shaped passage extending axially of the shaft joining at one end with the disc-shaped passage, and successive radially inwardly extending disc-shaped passages joining with axially extending sleeve-shaped passages following one another along the seal, said pump having a chamber disposed between the rear of the impeller and the end of the seal which is closer to the impeller, and a fluid return conduit extending from said chamber to the intake zone of said housing.

9. The seal of claim 1, which further includes a lubricant distribution groove formed in at least one of said members communicating with an axially extending sleeve-shaped passage, and means for introducing lubricant to said groove.

* * * * *